March 31, 1925.
K. R. WILSON
1,531,775
COMBINATION MACHINE FOR CYLINDER BLOCK REPAIRING
Filed July 23, 1921 4 Sheets-Sheet 1
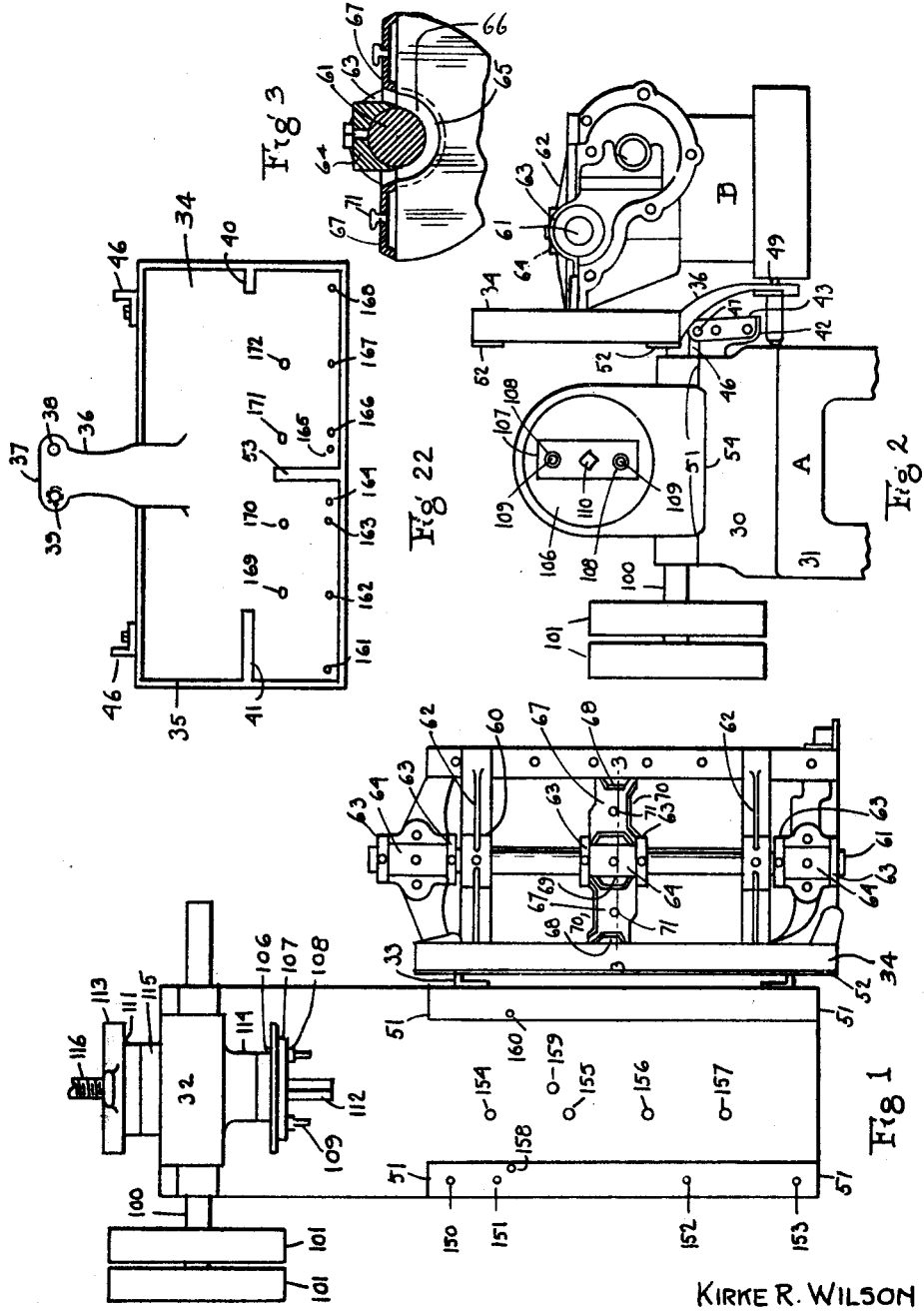
KIRKE R. WILSON
INVENTOR
BY Clarence S. Walker
ATTORNEY March 31, 1925.
K. R. WILSON
COMBINATION MACHINE FOR CYLINDER BLOCK REPAIRING
Filed July 23, 1921  4 Sheets-Sheet 2
1,531,775
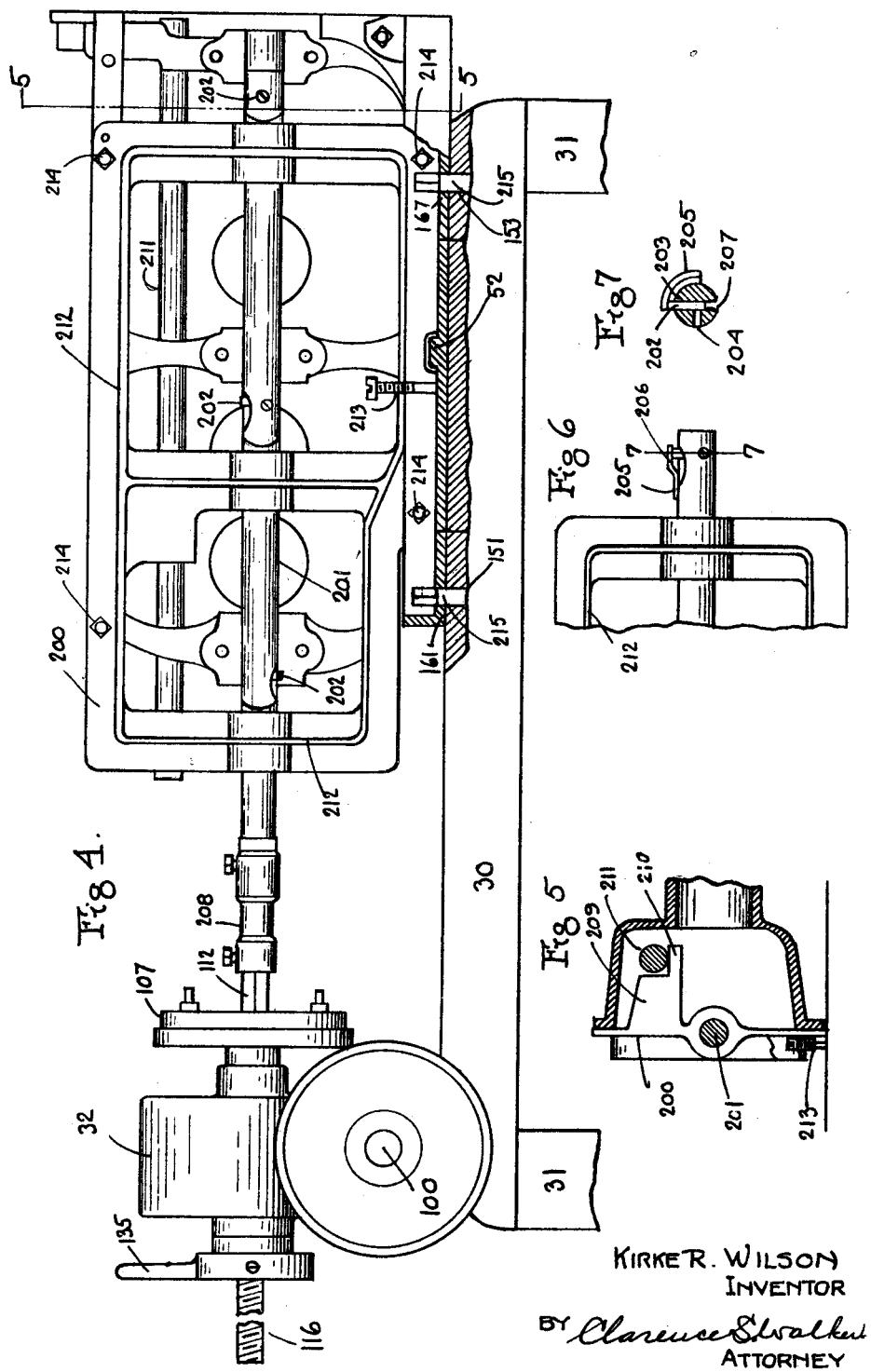
KIRKE R. WILSON
INVENTOR
BY Clarence S. Walker
ATTORNEY

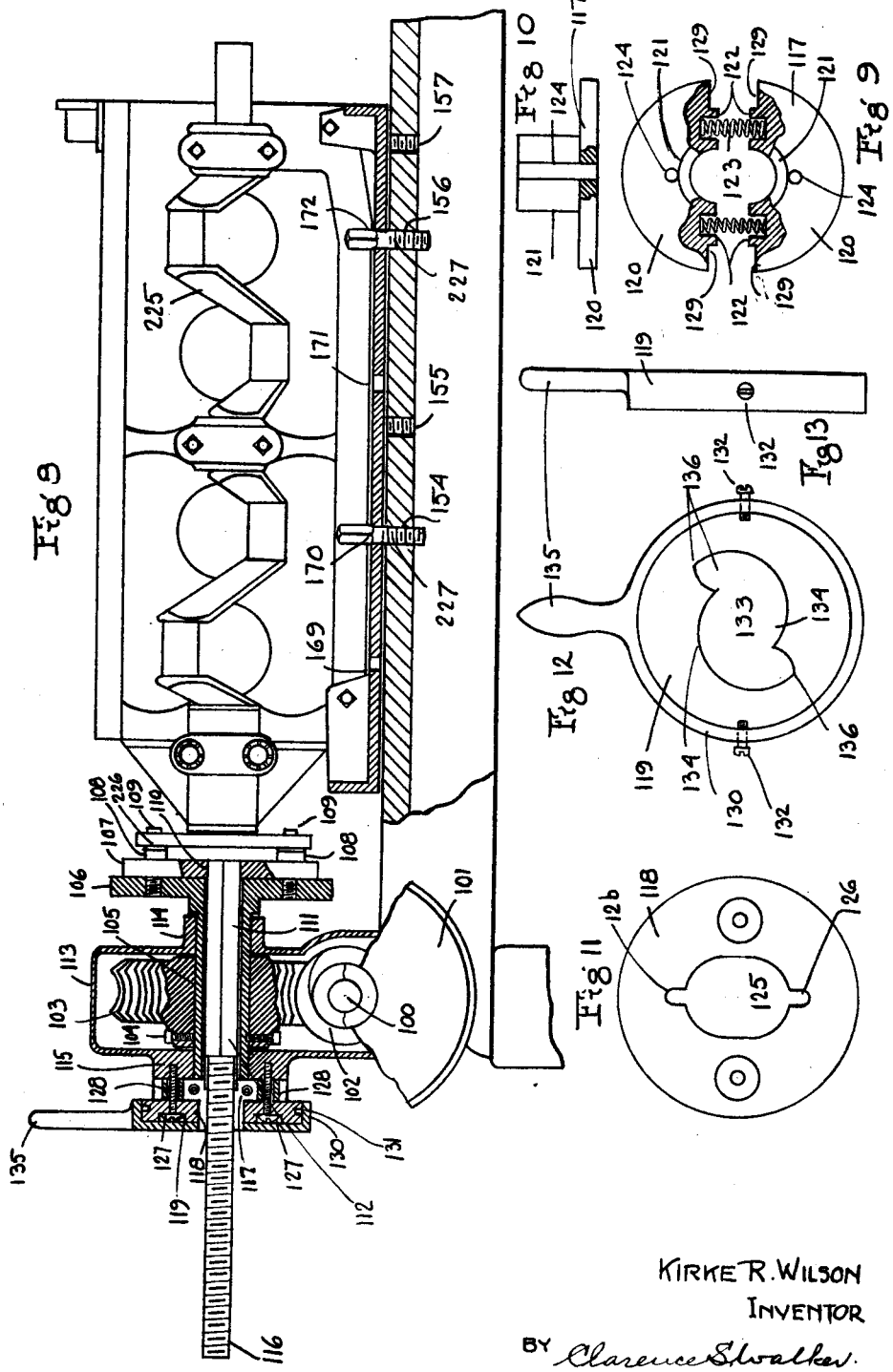

March 31, 1925.
K. R. WILSON
1,531,775
COMBINATION MACHINE FOR CYLINDER BLOCK REPAIRING
Filed July 25, 1921 4 Sheets-Sheet 4
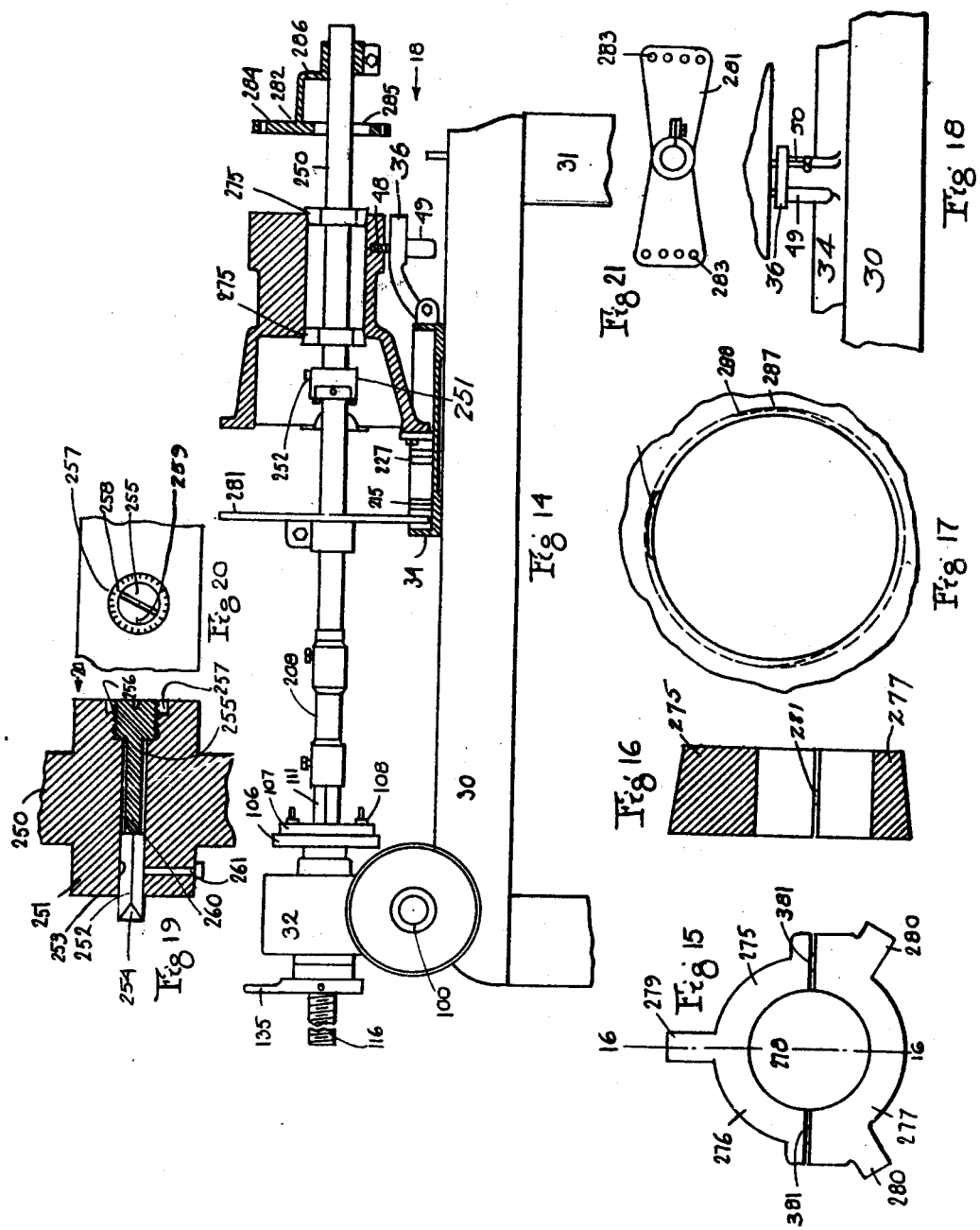
KIRKE R. WILSON
INVENTOR
BY Clarence S Walker
ATTORNEY

Patented Mar. 31, 1925.

1,531,775

UNITED STATES PATENT OFFICE.

KIRKE R. WILSON, OF BUFFALO, NEW YORK.

COMBINATION MACHINE FOR CYLINDER BLOCK REPAIRING.

Application filed July 23, 1921. Serial No. 457,035.

*To all whom it may concern:*

Be it known that I, KIRKE R. WILSON, a citizen of the United States, and a resident of Buffalo, in the county of Erie and State of New York, have invented a certain new and useful Improvement in Combination Machines for Cylinder Block Repairing, of which the following is a specification.

This invention relates to an improvement in combination machines, by the use of which the cylinder block of a hydrocarbon motor is firmly held in a number of different positions to facilitate repairing operations.

One object of this invention is to provide a machine having a plate or bed to which the cylinder block being repaired is secured and which can be shifted into various positions so that the motor bearings can be accurately rebabbitted, bored and either burned-in or reamed on the machine, and worn or scored cylinders be rebored.

Another object of this invention is to provide means for reboring scored cylinders by removing only the surface adjacent the scored portion and thus not unduly increasing the cylinder diameter.

A further object is to provide means whereby the cutting blade of a boring bar can be easily and accurately adjusted.

Other objects will appear from an examination of the specifications and the drawings which form a part thereof and in which—

Fig. 1 is a plan view of one embodiment of the invention with the cylinder block supported in the first position;

Fig. 2 is an end elevation of the same with the parts in the position shown in Fig. 1;

Fig. 3 is a cross section taken on the line 3—3 of Fig. 1;

Fig. 4 is a side elevation of the machine with the cylinder block in the second position;

Fig. 5 is a cross section taken on the line 5—5 of Fig. 4;

Fig. 6 is a detail of the boring bar disclosed in Fig. 4, showing the means for adjusting the cutting blade.

Fig. 7 is a section taken on the line 7—7 of Fig. 6;

Fig. 8 is a side elevation of the machine with the cylinder block in the third position;

Figs. 9 to 13 inclusive are detail views of the split nut by which the reciprocation of the reaming and boring bars is controlled;

Fig. 14 is a side elevation of the machine with the cylinder block in the fourth position;

Fig. 15 is a front elevation of one of the cylinder boring bars locating plugs;

Fig. 16 is a section taken on the line 16—16 of Fig. 15;

Fig. 17 is a diagrammatic view showing ways in which a scored cylinder may be bored out;

Fig. 18 is a view taken in the direction of the arrow 18 in Fig. 14;

Fig. 19 is a transverse cross section of the cylinder boring cutter.

Fig. 20 is a side view of the same cutter taken in the direction of the arrow 20 in Fig 19;

Fig. 21 is a front elevation of one of the permanent guides for the cylinder boring bar; and Fig. 22 is a plan view of the plate or bed to which the cylinder block is secured.

In repairing motors one or more of the following operations are necessary, rebabbitting, boring, running-in or burning-in bearings, boring out worn or scored cylinders, grinding valves and assembling shafts, push rod bearings, pistons and rods. Before this invention was made several machines were needed in order to carry out all the above mentioned operations and as a result there was considerable handling of the cylinder block. It will therefore be observed that a single piece of machinery, made according to this invention, will replace several machines and at the same time reduce the necessary handling of the cylinder block to a minimum.

Referring to the drawings, the reference character A is used to designate the machine and the reference character B the cylinder block to be treated. The machine A comprises a base 30 supported on legs 31 and having at one end a power drive and feed 32. Hinged at 33 to the base 30 is the plate or bed 34 to which the cylinder block B is rigidly secured.

The bed 34, shown particularly in Fig. 22 has a peripheral flange 35 and an arm 36 projecting at an angle therefrom prefereably integral with the bed. The outer end 37 of the arm 36 is enlarged and machined and in it are provided two holes 38 and 39 for a purpose to be described later. Projecting from the flange 35 at each side of the bed are integral plates 40 and 41, against the inner faces of which the bottom flange of the cylinder block to be treated is rigidly secured by bolts passing through holes in the plates 40 and 41 and engaging holes already drilled in the cylinder block. In order to locate the block accurately on the bed, the faces of the plates 40 and 41 are accurately machined into alignment. The embodiment shown is particularly adapted for Ford motors and the holes in the plates are so arranged that when the cylinder block is in alignment on the bed 34, they will always coincide with certain holes already provided in the block for the bolts holding the lower half of the crank case in position. The outer end of the block is bolted to the plate 40 and the inner end to the plate 41.

The hinges by which the bed 34 is joined to the base comprise angle plates 42 fixed to the base and carrying the hinge plate 43 and angle plates 46 bolted to the bed 34 in such a position that they contact with the hinge plates 43. A rod 47 inserted through the coinciding holes in the plates 43 and 46 holds the two parts together and acts as a hinge pin and can be easily removed when it is desired to shift the position of the bed on the base.

The hole 38 in the arm 36 is not threaded and is so located that it coincides with the hole 48 (Figure 14) always provided in a Ford cylinder block for one of the bolts by which the water jacket (not shown) is secured to the block. A pin 49 passing through the hole 38 is threaded into the hole 48 and clamps the block in place. The hole 39 is threaded and so located that it does not coincide with a hole in the cylinder block so that the end of the bolt 50 (Figure 18) passing through the hole 39 bears against the block and by turning the bolt the block is raised or lowered. The bolt 50 thus determines the position of the block relative to the bed while the bolt 49 holds the parts in that position.

Along the longitudinal edges of the base 30 are raised faces 51 which are machined into absolute alignment. By these faces the various positions of the cylinder block are accurately determined. The under side of the bed 34 is similarly provided with raised faces 52. The faces 52 are accurately machined and when the bed is in position, rest on the faces 51 of the base. On the upper side of the bed 34 is formed an integral projection 53 the upper face of which is machined into absolute parallelism with the faces 52.

After the cylinder block has been mounted on the bed and bolted to the inner faces of the plates 40 and 41 a square or level is placed against the block flanges and rested on the projection 53. The bolt 50 is now turned to shift the block into the desired direction until it is exactly at right angles to the projection 53 and consequently to the faces 51 and 52. When this position has been reached the pin 49 is tightened to fix the block in place. The enlarged outer end of the pin 49 is of such length that when the bed is swung on its hinges into the first position, as shown in Figs. 1 and 2, it bears against the base and holds the bed faces 52 at right angles to the base. Since the cylinder block has previously been adjusted on the bed until it is at right angles to the bed faces it follows of course that it is now exactly parallel to the faces 51 of the base.

In this position the bearings are rebabbitted by pouring Babbitt metal onto the bearing surfaces. To insure accurate bearings a fixture 60 is employed comprising a rod 61 of a diameter slightly smaller than that of a Ford crankshaft supported on the block by cross arms 62. On the rod 61 at each side of each bearing are pinned rings 63 and at each bearing a plate 64 is bolted to the rod between each set of rings 63 for the purpose to be described below. The arms 62 which are fixed to the rod 61 hold it above the bearing surfaces 65 so as to provide a space for the babbitt lining. (See Fig. 3.)

In order to guide the babbitt so that it will fill the space 66 determined by the rings 63 at each end of the bearing surface 61, funnel blocks 67 are employed. These blocks are cut away on three sides to provide the funnels 68, 69 and 70. Referring to Fig. 1 it will be noted that these funnels are of different sizes corresponding to the sizes of the bearings of the cylinder block B. The funnel 68 will be used for the front bearing the funnel 69 for the center bearing and the funnel 70 for the rear bearing. A knob 71 on each block facilitates handling and may be engaged by lifting tongs when the block is hot. Fig. 3 shows the position of the various parts when ready for pouring the babbitt.

The plate 64 in addition to cooperating with the funnel blocks 67 also functions to prevent the babbitt from contacting with half the circumference of the rod 61. If this plate were not used and the babbitt allowed to creep around the rod so as to partly enclose it the rod could obviously not be removed without destroying the formed bearing. As shown in Figs. 1 and 3 the plates as well as the cross arms 62 are firmly fixed to the rod thus insuring the formation of accurate bearings in each case.

The power drive and feed mechanism 32 is mounted on the face 54 of the base which is parallel to the faces 51 and is operated by a shaft 100 having loose and drive pulleys 101, adapted to be operated by any suitable source of power. On the shaft 100 is a worm 102 (Figure 8) which meshes with a worm wheel 103 fixed by screws 104 to a sleeve 105. The sleeve 105 has at one end a disk 106 here shown as integral therewith to which disk is bolted a plate 107 by cap screws 108 having dowel like projections 109 from the caps for the purpose pointed out below. Through the middle of the plate 107 is broached a rectangular hole 110 which receives the squared portion 111 of a shaft 112 which extends through the sleeve 105. The worm and worm wheel are enclosed by a housing 113 having at each side projecting flanges 114 and 115 which act as bearings for the sleeve 105. As shown particularly in Fig. 8 the shaft 112 has also a threaded portion 116 which normally projects from the sleeve 105. The threaded portion 116 is somewhat longer than the squared portion 111 for the reason to be pointed out later.

In certain uses of this machine it is necessary that the shaft 112 move longitudinally or feed as well as rotate. This function is obtained by the use of a split nut mechanism comprising a split nut 117, an annular guide plate 118 and a cover 119. The split nut 117 is made up of two similar members 120, each including a semi-circular boss 121. In the adjacent faces of the members 120 at each side of the bosses 121 are pockets 122 to receive the ends of springs 123 by which the members 120 are normally held apart as shown in Fig. 9. Projecting from the outer face of each member 120 adjacent the center of the boss 121 is a pin 124, the function of which will be pointed out later.

The guide plate 118 has an oval opening 125 in its center through which the bosses 121 and pins 124 project, recesses 126 being provided at each end of the oval to receive the pins. Screws 127 passing between the members 120 outside the springs 123 secure the guide plate to the flange 115 of the housing. Collars 128 are slipped over the screws to separate the guide plate from the flange and prevent binding of the members 120 against reciprocation. Pockets 129 are provided in the adjacent faces of the members 120 in which the collars 128 will seat when the members are brought into contact. Hence the guide plate 118, by its oval opening 125 with the recesses 126, limits the separation of the members 120. The inner faces of the bosses 121 are threaded so that when the members 120 are brought together the threaded portion 116 of the shaft 112 is engaged. Inasmuch as the members 120 are held against longitudinal movement, if the shaft 112 so engaged be rotated it must necessarily move longitudinally. The collars 128 and the pockets 129 determine the approach of the members to each other and thus prevent mutilation of the threads by too close engagement of the bosses 121 and the shaft 112.

The cover 119 has a peripheral flange 130 which completely encloses the guide plate 118. An annular groove 131 formed in the outer face of the plate 118 receives the screws 132 which project through the flange 130 so that the cover is held in place but allowed a rotative movement when desired. Through the center of the cover 119 is an opening 133 for the bosses 121 and pins 124 of the member 120.

The edges of the opening 133 have a double cam-like contour so formed that when the pins 124, which under pressure of the springs 123 always bear against the edges, are at the diametrically opposite high points 136 they will lie in the recesses 126 of the guide plate 118 and the bosses 121 will be out of engagement with the shaft 112. When, however, the cover is oscillated on the plate 118 by the handle 135 the bosses are forced closer together until when the low parts 134 of the edge bear against the pins the bosses are in mesh with the shaft and any rotation thereof causes it to shift longitudinally.

In the base 30 and bed 34 are provided a number of holes by means of which the bed can be fixed securely in position while certain operations are performed. Referring particularly to Figs. 1 and 22 it will be noted that there are in the base three sets of such holes: an outer set in the outer face 51 and numbered 150, 151, 152 and 153 respectively, an intermediate set 154, 155, 156 and 157 and a transverse set 158, 159 and 160, the holes 158 and 160 being in the faces 51 and locating a line at right angles to the shaft 112. In the bed 34 are two sets, the outer holes 161, 162, 163, 164, 165, 166, 167 and 168, and the inner holes 169, 170, 171 and 172.

The position shown in Figs. 1 and 2 and referred to as the first position is that of the cylinder block when the main or crank shaft bearings are to be rebabbitted. It is also the position in which the crank shaft is most easily assembled and the bearings for the cam shaft and valve push rods are preferably reamed.

After the bearings have been rebabbitted as described above, the rod 61 is removed and the bearings are subjected to a further operation by which the exposed surface of the babbitt is made to conform accurately to the motor crank shaft. This may be done either by scraping the surface with a borer or reamer or by burning-in or running-in the bearings with the crank shaft. The first method is preferred because Babbitt metal being more or less porous, it leaves the grain of the metal open so that the bearings will retain a certain amount of oil film while bearings finished by the second method, altho highly glazed and much harder, will not retain the oil as well and will not wear as long. However both methods can be carried out by this embodiment of the invention.

The first method is performed when the cylinder block is in the position shown in Fig. 4 and referred to as the second position. First there is bolted to the block a fixture 200 carrying in alignment with the bearings a boring bar 201 having a plurality of cutters 202. These cutters are embedded in the bar as at 203 in Fig. 7 and are held in place by screws 204. In order to adjust a cutter in the bar a jig 205 is provided which, as is shown in detail in Figs. 6 and 7 is a curved plate adapted to bear closely against the bar 201 and having on its inner face a portion 206 recessed to receive the outer end of the cutter and determine the amount of projection. In using this jig it is first applied with its inner face against the bar and the porton 206 over the end of the cutter. The screw 204 is now loosened and the cutter is pushed out against the jig by some means inserted through the flared opening 207 against the butt of the cutter. The cutter is thus quickly and accurately adjusted.

The boring bar 201 is fastened to the head 106 by an intermediate coupling or union 208 which connects the end of the boring bar to the shaft 112 which projects from the face of the plate 107. In order to position the boring bar accurately with reference to the other parts of the motor, and particularly in order to insure that the crank shaft bearings shall carry the crank shaft absolutely parallel to the cam shaft, plates 209 (Figure 5) project from the back of the fixture 200. The end of each plate is notched to provide a finger 210 which rests against the cam shaft 211. Threaded through the flange 212 on the outer face of the fixture 200 is a bolt 213 which bears against the bed 34. After the fixture has been applied to the cylinder block with the finger 210 below the shaft 211 the bolt 213 is turned until the fingers rest against the shaft. The fixture is now further held onto the cylinder block by bolts 214 through the flanges. In order to hold the bed and block against shifting, pins 215 are inserted through the holes 161 and 167 in the bed into the holes 151 and 153 in the base. Since the boring bar must be moved longitudinally the split nut mechanism must be brought into engagement with the threaded end 116 of the shaft 112.

Should it be desired to carry out this scraping operation by reaming, a suitable fixture and reamer are substituted for the fixture 200 and the boring bar 201, the other arrangements being unchanged.

The position shown in Fig. 8 of the drawings, referred to for convenience as the third position, is that which the cylinder block with its supporting bed 34 occupies when the rebabbitted main bearings are treated according to the second method, i. e., burned-in or run-in. In performing this operation the cylinder crank shaft 225 is mounted in place and driven by the plate 107 through the dowel like projections 109 which engage bolt holes in the shaft flnange 226. The bed is held securely in place on the base by threaded pins 227 which, through the holes 170 and 172 in the bed 34 are screwed into the holes 154 and 156 respectively in the base 30. In addition to the pins 227 there may be used pins 215 extending through the holes 163 and 168 in the bed 34 into the holes 150 and 152 respectively in the base 30. While the last named pins may not be absolutely essential it has been found that the bed is more securely held if they are used as well as the threaded pins 227.

Fig. 14 shows the fourth position which differs from the other positions described in that the cylinder block is mounted transversely on the base instead of longitudinally. When so positioned the cylinders of the block are bored out by the use of a boring bar 250. The bed is held in place by one of the pins 227 inserted through one of the holes 169, 170, 171 or 172, depending upon which cylinder is to be bored and screwed into the hole 159. In addition to the pin 227 pins 215 are inserted in the holes 158 and 160 in the base, passing through the set of holes 161 and 163 when the pin 227 is inserted in hole 169; 162 and 165 when in 170; 164 and 167 when in 171; and 166 and 168 when in 172. The bed is thus held in place by triangularly arranged means having an apex directly in front of the cylinder operated upon so that the block is held rigidly in alignment with the power drive 32 and the cylinder is accurately bored.

The boring bar 250 is fixed to the shaft 112 by any suitable connection such as, for example, the connection 208 shown in Fig. 4 and has an enlarged intermediate portion 251 from which projects the cutting edge of the blade 252. The blade is usually rectangular and is mounted in a rectangular pocket 253 broached thru the bar. The blade 252 having a cutting edge 254 extends only part way through the pocket 253 and rests on a screw 255 threaded through the lower end of the pocket which has been bored and enlarged. The enlarged end 256 of the pocket is internally threaded to receive the screw 255 and opens into a flattened annular depression 257 on the bar. Arranged in a circle on the depression 257 around the screw head are twenty-four equally spaced radial lines 258 while on the screw head is a single line 259 radiating from the same center as the lines 258. The head of the screw 255 is larger than the body portion 260 which bears against the inner end of the cutter blade 252.

In setting the blade for cutting a micrometer is used and the blade is fixed by means of the screw 255 and the holding screw 261 so as to contact with the inner surface of the average cylinder of the kind of motor operated upon. Should it be found upon examination that the cylinder to be bored is larger or smaller than the average the projection of the blade is increased or diminished by means of the screw 255, the lines 258 and 259 acting as a micrometer to guide such a change.

The boring bar is preliminarily located in the cylinder to be bored by means of tapered plugs 275 shown in detail in Figs. 15 and 16. These plugs comprise two blocks 276 and 277 each having a semi-cylindrical recess so that when assembled as shown in the drawings a cylindrical hole 278 for the boring bar is provided. On the block 276 is provided a tapered fin 279 and on the block 277 are provided the tapered fins 280. These blocks are held together by dowels 281 and are accurately ground so that the outer faces of the fins 279 and 280 form part of the face of a cone whose center lies on the longitudinal axis of the hole 278.

The plugs 275 are placed on the boring bar which is in the cylinder to be bored and are then forced into each end of the cylinder as far as they can go. This, by reason of the accurate machining of the blocks, positions the cutter bar at the center of the cylinder.

Permanent guides 281 and 282 are now employed, the former at the bottom of the cylinder block and the latter at the top. The guide 281, shown in Fig. 21, which has a row of holes 283 at each end, is slipped over the end of the boring bar and bolted against the bottom flanges of the cylinder block. These flanges have rows of holes through which the lower half of the crank case, not shown, is bolted in place and by providing the rows of holes 283 at each end of the guide, it is possible to find a set through which the guide 281 can be bolted to the block.

The guide 282 has a body plate 284 which is bolted to the top of the cylinder block and in which is a hole 285 larger than the preliminary plug 275, so that when the guide 282 is bolted into place it surrounds the guide 275. Projecting from the plate 284 is a bearing arm 286 by which the cutter bar is supported. It will be noted by an examination of Fig. 14 that when the permanent guides are in position the preliminary plugs or guides are easily removable, that at the bottom by reason of the opening at the bottom of the cylinder block, and that at the top because the bearing arm is spaced from the upper side of the block. The plugs are first pulled out of the cylinders and then separated into the blocks 276 and 277. The cutter bar when held by the plugs 275 could not be revolved but the permanent guides provide bearings in which the bar can be rotated and also advanced, the handle 135 of the cover 119 being thrown over so that the bosses 121 will engage the shaft 112 and cause it to advance longitudinally as well as to rotate.

The shaft 112 has, as shown in Fig. 8, a threaded portion 116 and a squared portion 111, and is driven solely by the engagement of the plate 107 with the squared end. Obviously therefore if the split nut mechanism engages the shaft until it is so far advanced that the squared portion projects entirely from the broached hole 110 the result will be that the shaft will no longer revolve. In view of this fact the lengths of the portions 111 and 116 have been so determined that after the blade 252 has passed completely through the cylinder being bored the squared portion 111 projects entirely from the hole 110 and the operative action of the machine ceases. Thus the boring is automatically controlled so that while the cylinder is being bored the operator can busy himself elsewhere with the knowledge that the operation will cease when the work is finished.

The plugs or guides 275 shown in Figs. 15 and 16 are, as pointed out above, absolutely symmetrical. Fig. 17 however shows the way in which a cylinder is often scored. When a cylinder is scored, as shown in that figure, it is wasteful to remove the material equally all around and thus increase the cylinder diameter to the extent shown by the circle 287. Instead of so doing the material within the circle 288 may be removed. While this shifts the center of the cylinder slightly it does not affect its operation to any noticeable extent and on the other hand it prolongs the life of the cylinder, since many cylinders which could not be bored out by the old process can now be bored out. This operation can only be performed if the center of the cutter bar be shifted and in order to do so the plugs or guides 275 are made offset, in other words the fins are machined not from the center of the cylindrical hole 278 but from another point, the desired distance away. The offset plugs are then inserted in the cylinder with their center line shifted nearer the scored side of the cylinder and the center of the cutter bar will necessarily be equally shifted so that the material within the circle 288 will be removed, by the rotating blade 252. The location of the cutter bar in the cylinder is determined by the plugs 275 and not by the permanent guides 281 and 282 which simply hold the bar in the position which has been previously determined for it by the plugs 275.

While one embodiment only of my invention has been shown and described I am not to be limited thereby since it is obvious that others could be made without departing from the spirit and scope of my invention as set forth in the following claims.

Having thus set forth my invention that which I claim as new and for which I desire the protection of Letters Patent of the United States is the following:

1. In a machine of the class described, a supporting base and a bed to which is secured a cylinder block upon which several operations are to be performed, both said base and said bed having a plurality of holes, certain of which coincide to indicate that the bed is in a predetermined position on the base for the performance of a certain operation.

2. In a machine of the class described, a cylinder block supporting bed, machined and aligned faces on the under side of said bed, means for securing said block to said bed and a projection on said bed having a face machined into parallelism with the said faces on the bed, said projection being available for co-operation with a suitable instrument by which the angle of the face of the block relatively to said faces on said bed may be determined.

3. In a machine of the class described, a cylinder block supporting bed, machined and aligned faces on the under side of said bed, means for securing said block to said bed, a projection on said bed having a face machined into parallelism with the said faces on the bed, said projection being available for co-operation with a suitable instrument by which the angle of the face of the block relatively to said faces on said bed may be determined, and an arm extending from said bed on which the side of said cylinder block is supported.

4. In a machine of the class described, a cylinder block supporting bed, machined and aligned faces on the under side of said bed, means for securing said block to said bed, a projection on said bed having a face machined into parallelism with the said faces on the bed, said projection being available for co-operation with a suitable instrument by which the angle of the face of the block relatively to said faces on said bed may be determined, an arm extending from said bed on which the side of said cylinder block is supported and means for adjusting said block relative to said arm.

5. In a machine of the class described, a cylinder block supporting bed, machined and aligned faces on the under side of said bed, means for securing said block to said bed, a projection on said bed having a face machined into parallelism with the said faces on the bed, said projection being available for co-operation with a suitable instrument by which the angle of the face of the block relatively to said faces on said bed may be determined, an arm extending from said bed on which the side of said cylinder block is supported and means for adjusting said block so that its lower face is at right angles to the machined face of said projection.

6. In a machine of the class described, a cylinder block supporting bed, machined and aligned faces on the under side of said bed, means for securing said block to said bed, a projection on said bed having a face machined into parallelism with the said faces on the bed, said projection being available for co-operation with a suitable instrument by which the angle of the face of the block relatively to said faces on said bed may be determined, an arm extending from said bed on which the side of said cylinder block is supported and means on said arm for adjusting said block so that its lower face is at right angles to the machined face of said projection.

7. In a machine of the class described, a cylinder block supporting bed, plates at each side, means for securing said block to said plates and an arm on said bed by which the side of said cylinder block is supported.

8. In a machine of the class described, a cylinder block supporting bed, plates at each side, means for securing said block to said plates, an arm on said bed by which the side of said cylinder block is supported and means for adjusting said block relative to said arm.

9. In a machine of the class described, a cylinder block supporting bed, plates at each side, means for securing said block to said plates, an arm on said bed by which the side of said cylinder block is supported, and means for adjusting said block relative to said arm and holding it in the adjusted position.

10. In a machine of the class described, a cylinder block supporting bed, plates at each side, means for securing said block to said plates, an arm on said bed by which the side of said cylinder block is supported and a set screw threaded in said arm and bearing against said cylinder block to adjust said block relative to said arm.

11. In a machine of the class described, a cylinder block supporting bed, plates at each side, each plate having one side machined into accurate alignment with the corresponding side of the other plate, and means for securing the cylinder block to said plates.

12. In a machine of the class described, a cylinder block supporting bed, plates at each side, each plate having one side machined into accurate alignment with the corresponding side of the other plate, and means for securing one lower flange of said cylinder block to said plates.

13. In a machine of the class described, a cylinder block supporting bed, plates at each side, each plate having one side machined into accurate alignment with the corresponding side of the other plate, and means for securing one lower flange of said cylinder block to the machined side of each plate.

14. In a machine of the class described, a cylinder block supporting bed, plates at each side thereof, means for bolting said cylinder block to said plates and a machined projection from said bed in front of said block to support a square whereby the latter can be accurately positioned on the bed.

15. In a machine of the class described, a cylinder block supporting bed, plates at each side thereof, means for bolting said cylinder block to said plates, an arm extending from said bed on which said block rests, and a machined projection from said bed in front of said block to support a square whereby the latter can be accurately positioned on the bed.

16. In a machine of the class described, a cylinder block supporting bed, plates at each side thereof, means for bolting said cylinder block to said plates, an arm extending from said bed on which said block rests, a machined projection from said bed in front of said block to support a square whereby the latter can be accurately positioned on the bed and means in said arm for adjusting said block.

17. In a machine of the class described, a supporting base, a bed hinged thereto, and a pin on said bed adapted to bear against said base when said bed is swung relative to said base by reason of its hinged connection therewith.

18. In a machine of the class described, a supporting base, a bed hinged thereto and upon which a cylinder block may be mounted and a pin on said bed for threaded engagement with the cylinder block and adapted to bear against said base when said bed is swung relative to said base by reason of its hinged connection therewith.

19. In a machine of the class described, a bed by which the work is carried, an arm extending from said bed and a pin rigidly holding the work to said arm.

20. In a machine of the class described, a bed by which the work is carried, an arm extending from said bed and a bolt threaded through said arm bearing against the work.

21. In a machine of the class described, a bed by which the work is carried, an arm extending from said bed, a bolt threaded through said arm bearing against the work and a pin through said arm adapted to be threaded into said work.

22. In a machine of the class described, a bed by which the work is carried, an arm extending from said bed, and a bolt carried by said arm to bear against the work and determine the position thereof relative to said arm.

23. In a machine of the class described, a bed by which the work is carried, an arm extending from said bed, a bolt carried by said arm to bear against the work and determine the position thereof relative to said arm and a pin carried by said arm to hold the work in such position.

24. In a machine of the class described, a bed by which the work is carried, an arm extending from said bed and means carried by said arm for determining the position of the work relative to the arm.

25. In a machine of the class described, a bed by which the work is carried, an arm extending from said bed, means carried by said arm for determining the position of the work relative to the arm and means for holding the work in such position.

26. In a machine of the class described, a supporting base, a bed hinged thereto on which the work is carried, an arm extending from said bed, and a pin on said arm adapted to bear against said base when said bed is swung relative to said base by reason of its hinged connection therewith.

27. In a machine of the class described, a supporting base, a bed hinged thereto on which the work is carried, an arm extending from said bed, a bolt carried by said arm and determining the position of the work relative to the arm, and a pin on said arm adapted to bear against said base when said bed is swung relative to said base by reason of its hinged connection therewith.

28. In a machine of the class described, in combination, a supporting base, a driving shaft and operating mechanism therefor mounted at one end of said base, a bed movably mounted relatively to said base and adapted for support thereon in various positions, means for the attachment of a cylinder block to said bed, the bed and the base having co-operating elements for alining the bed in said positions on said base in which sundry operations may be accomplished on the cylinder block by the aid of said shaft, and means for fixing the bed against displacement from any of said certain position.

In testimony whereof, I affix my signature.

KIRKE R. WILSON.